Patented Mar. 10, 1925.

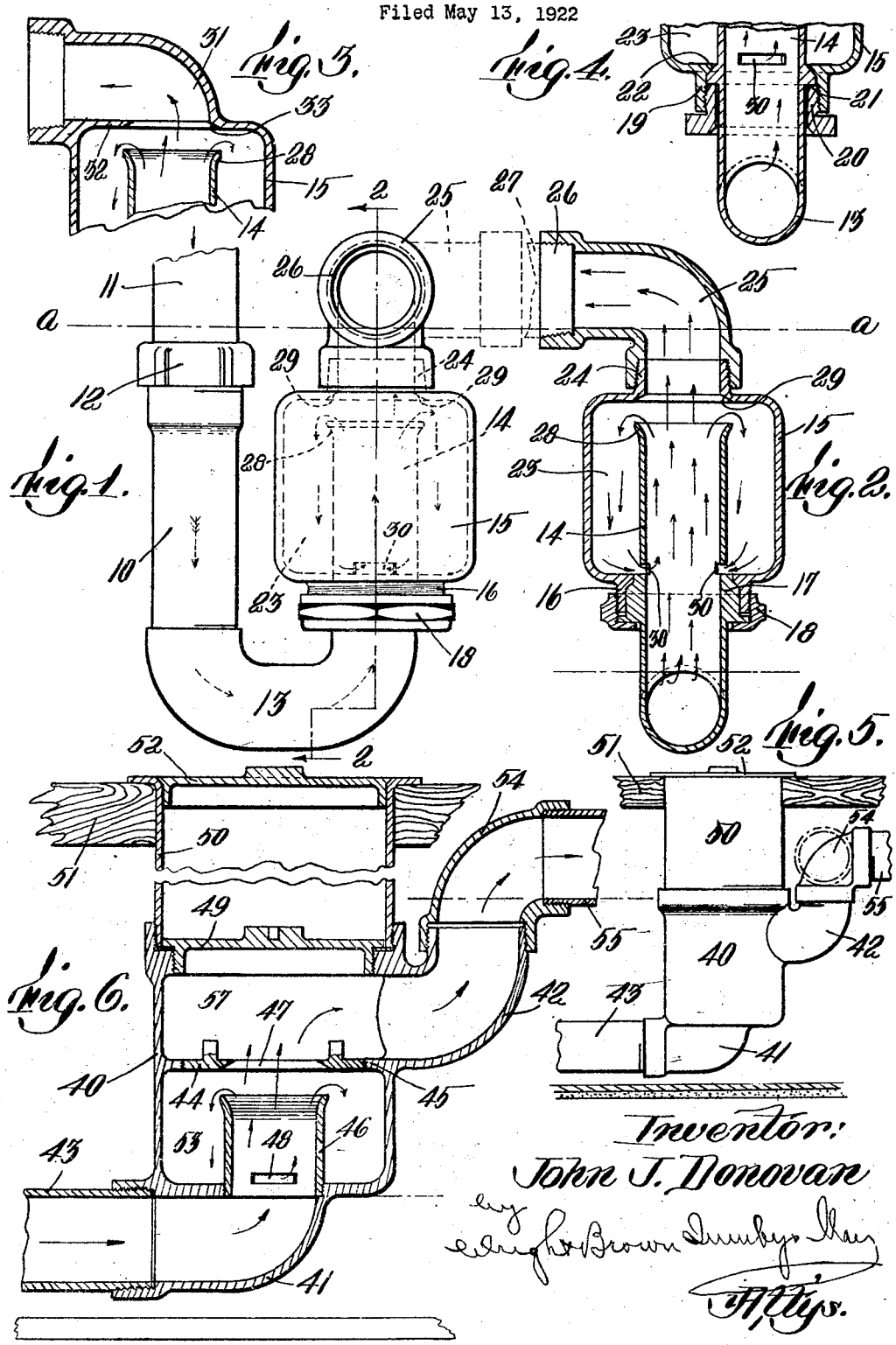

1,529,174

UNITED STATES PATENT OFFICE.

JOHN J. DONOVAN, OF BOSTON, MASSACHUSETTS.

NONSIPHONING TRAP.

Application filed May 13, 1922. Serial No. 560,555.

*To all whom it may concern:*

Be it known that I, JOHN J. DONOVAN, a citizen of the United States, residing at Boston, in the county of Suffolk and State of Massachusetts, have invented new and useful Improvements in Nonsiphoning Traps, of which the following is a specification.

The object of the present invention is to provide a non-siphoning trap, the use of which will dispense with the necessity of back vents such as are customarily employed.

In achieving this object, I also provide a trap which is substantially self-cleaning, and which is so constructed that it may be readily taken apart should it become necessary.

The trap is so constructed as to provide a water chamber which normally is below the level of the water seal, and which contains a body of water sufficient to provide an effective seal. This chamber communicates with a water passage in the trap in such a way that, when the trap is flushed, there is a body of water constantly in the chamber, which, when the flushing operation is suspended, is effective in sealing the trap, even though the vacuum at the discharge or outlet limb of the trap is complete.

In the particular embodiments of the invention illustrated by the drawings and described in detail in the following specification, the water chamber is annular and surrounds a central conduit through which the water is discharged from the trap, but the chamber communicates at its upper and lower ends with the central conduit, so that water may circulate from the central conduit through the chamber. When water is discharging through the central conduit, apparently it acts (on the ejector principle) to draw water from the lower end of the chamber. but such water is replaced by water which flows or is drawn into the upper end of the chamber, with the result that, if by siphonic action the water from the main body of the trap is exhausted on the breaking of the vacuum, there is enough water in the chamber to flow into the main body of the trap and furnish an effective seal. The central conduit may with convenience be in the form of a standpipe placed in the up-limb of the trap and alined with outlet portion thereof, so as to offer no obstruction to the passage of water through the trap. In such case, the communication between the chamber and the lower end of the conduit is effected by one or more ports formed in the standpipe, and the upper end of the standpipe terminates short of the top of the chamber, so that water can flow or be drawn into the upper end of the chamber to replace that which passes through the aforesaid port or ports from the chamber.

It is evident, however, that the invention may be embodied in different forms for special purposes.

On the accompanying drawings,—

Figure 1 represents a trap embodying the invention adapted for sinks, basins or the like.

Figure 2 represents a section therethrough on the line 2—2 of Figure 1.

Figure 3 represents the upper end of a trap wherein the lateral elbow is formed integrally with the casing which provides the chamber.

Figure 4 represents in section a form of coupling which may be employed for securing the standpipe in the casing.

Figures 5 and 6 represent a bathtub trap embodying the invention, Figure 6 being on a larger scale than Figure 5 and showing the trap in section.

The chamber and vertical standpipe or conduit are both so arranged that normally they are submerged in the water contained in the trap and are consequently normally full of water, being below the lateral elbow or outlet from the trap, and the chamber is large enough to contain a considerable body of water, sufficient in volume to form a seal in the trap if permitted to flow therefrom to the lower portion or bend of the trap.

As illustrated in Figures 1 and 2, the trap is shown as provided with an inlet or down limb 10, to the upper end of which a waste pipe 11 may be secured by any suitable coupling 12. The lower end of the limb 10 may be threaded into a U-shape section 13 which communicates directly with a vertical standpipe or conduit 14, which, in this particular embodiment of the invention, may be formed integrally therewith. 15 indicates a casing which encloses the standpipe, and which, as shown in Figure 2, may have a nipple 16 having a ground beveled seat to engage a complementally bevelled flange 17 on the standpipe. A coupling sleeve 18, screwed on the exterior of the nipple and engaging the flange 17, serves to bind the standpipe and the casing tightly together. In lieu of this arrangement, the nipple may, as indicated at 19 in Figure 4, be internally threaded to receive the coupling 20, so that its end engages a flange 21 on the standpipe and binds the bevelled portion thereof against a complemental seat 22 on the casing.

The casing 15 is preferably circular in cross-section to provide the annular water containing chamber 23 between its wall and the standpipe. The upper end of the casing has a central, externally threaded nipple 24, in Figures 1 and 2, to which is secured the elbow 25 which terminates in a lateral discharge end 26. To the latter is connected the usual waste pipe section as indicated in dotted lines at 27. It will be observed that the standpipe is alined with the nipple and the mouth of the elbow and that their internal diameters are about the same, so that an uninterrupted passageway is provided for the water through the up-limb of the trap, the normal level of the water in which being determined by the lateral mouth of the outlet elbow 25.

The standpipe 14 terminates short of the upper end of the casing 15 and may with advantage be slightly flaring as at 28, in which case the mouth of the nipple 24 may be beveled as indicated at 29. The standpipe is provided with one or more ports 30 opening into the chamber 23 on a level with the bottom wall thereof to allow sediment to fall into the body of the trap. By virtue of the construction described, there are passages or ports provided for water at both the upper and lower ends of the standpipe, so that water may circulate between the upper end of the standpipe and the top wall of the chamber to replace the withdrawn water and thus to keep the chamber full. When a vacuum is created in the waste pipe and when finally the supply of water ceases, the water in the lower bend of the trap is siphoned out, the vacuum breaks, and the water left in the annular chamber flows therefrom through the ports down into the U-bend of the trap to furnish an effective seal. If now the operation be repeated, the chamber is initially refilled, during the first part of the operation, with the final result of resealing the trap as previously described through the annular chamber and the standpipe.

As previously stated, under normal conditions the water fills the trap to a level as indicated by the dotted line a—a, Figures 1 and 2, so that the chamber and the standpipe are filled. If now a large volume of water be flushed through the trap, it will pass upwardly through the standpipe and out through the lateral outlet. As I have observed the operation, apparently the passage of water through the standpipe causes some water to flow from the chamber through the ports 30, and at the same time water is delivered to the upper end of the chamber by the annular port. It is my theory that, when a solid column of water is passing upwardly through the standpipe, the ejection of water through the ports 30 creates a partial vacuum in the chamber, as a result of which water is drawn into the upper end of the chamber, and thus there is a circulation as indicated by certain of the arrows in Figure 2. This is doubtless facilitated by the flaring confronting mouths 28, 29 of the standpipe 14 and the nipple 24.

It is quite evident that the lateral discharge elbow of the trap need not be formed separately from the casing 15, for, as I have shown in Figure 3, the elbow 31 may be cast integrally with the casing. In this case, the top wall 32 of the casing has the flared opening 33 which corresponds to the mouth of the nipple 24 in Figure 2.

It will be realized by those familiar with the art that the invention may be embodied in many different forms of traps. In Figures 5 and 6, I have shown a trap which may be used in connection with the waste pipe of a bathtub or other equivalent fixture or appliance. In this case, it is desirable to permit the cleansing of the trap without disturbing the waste pipe connections. Hence I provide a casing 40 formed at its lower end with an inlet elbow 41 and at its upper end with an outlet elbow 42. The elbow 41 forms a part of the lower bend of the trap, the down-limb of which is shown only in part and indicated at 43. The casing is divided by an apertured plate 44 screwed into engagement with the internal flange 45, the flange and the plate forming the upper end of the annular water-containing chamber. In this case the standpipe 46 may be formed separately and screwed into the bottom of the casing to form a continuation of the elbow 41, and its upper end is alined with the aperture 47 in the plate 44 to communicate with the chamber 57 which forms a portion of the up-limb of the trap. The standpipe has one or more ports 48. The upper end of the casing, which is closed by the removable screw plate 49, has an annular, internally threaded flange into which is screwed the lower end of a cylindrical box 50, whose outwardly flanged end may rest on the floor, indicated conventionally at 51. A removable cover 52 closes the upper end of the box. On removing the cover 52, the inner cover or top wall 49 of the casing and the plate 44, the standpipe and the annular chamber 53 are accessible for cleaning or repair. Normally the screw joint between the cover plate 49 and the casing is sealed, since the normal level of the water is above it. Connected to the outlet elbow 42 I have shown sections 54, 55 of the waste pipe leading from the trap. This trap operates in the manner previously described to secure a resealing of the trap, in the event of siphonic withdrawal of water from the lower bend of the trap, by water contained in the annular chamber 53.

In the traps as herein illustrated, the water chamber is arranged, for the sake of symmetry, as concentric with the standpipe; but this is not essential, the necessary feature being merely to provide a water-containing chamber below the normal water level, and communicating at its upper and lower ends with the conduit or up-limb of the trap; so that, in case siphonic action occurs, the chamber will when the siphonic action breaks, furnish sufficient water to reseal the trap. The up-limb of the trap (which comprises the standpipe and the conduit thereabove, i. e. the nipple 24 and the vertical end of the elbow 25 in Figure 2, or the chamber 57, the elbow 42 and the vertical portion of elbow 54 in Figure 6) provides for the direct discharge of water entering the trap through the down-limb. The water-containing chamber in both cases communicates with vertically spaced portions of the up-limb and is laterally disposed so as to be out of the normal course of water passing through said up-limb.

While I have referred to the trap as a non-siphoning trap, I mean, of course, one in which the seal is permanently broken by siphonic withdrawal of water therefrom, for in the trap as herein described, while it is possible to withdraw the water from the lower bend of the trap by siphonic action, yet it is impossible to break the seal permanently, since the discharge of water into the trap from the water chamber reseals the trap.

An additional feature of advantage is that the circulation of water through the water chamber keeps it relatively clean and comparatively free from deposit of foreign matter. Of course, practically every trap requires cleaning at times to free it from hair, lint and other matter which accumulates therein, or, when mixed with soap or grease, is deposited or caked on the walls thereof.

Having thus explained the nature of my said invention and described a way of making and using the same, without attempting to set forth all of the forms in which it may be made or all of the modes of its use, what I claim is:—

A non-siphoning trap comprising a casing, an outlet therefrom, a standpipe in said casing having its upper end terminating below the top of the casing and alined with said outlet and flaring outwardly at its upper end, said casing and standpipe forming a water chamber out of the normal path of water through said standpipe for refilling the trap, and said standpipe communicating with the lower end of said chamber.

In testimony whereof I have affixed my signature.

JOHN J. DONOVAN.